Dec. 29, 1942.  T. F. MENZEL  2,306,399
PACKAGING
Filed May 17, 1940    2 Sheets-Sheet 1
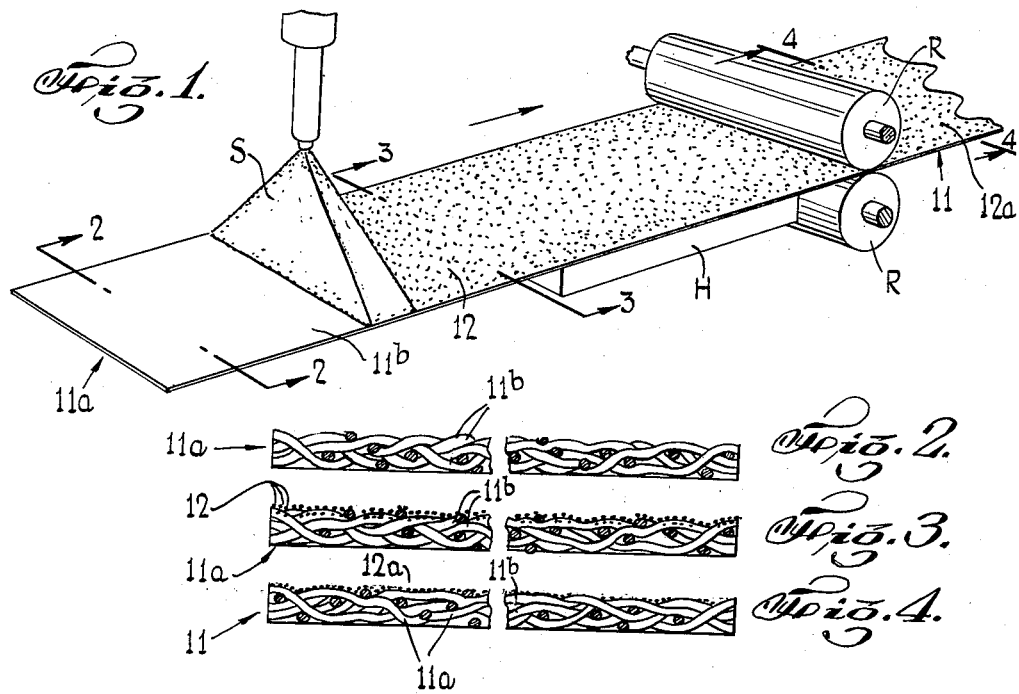
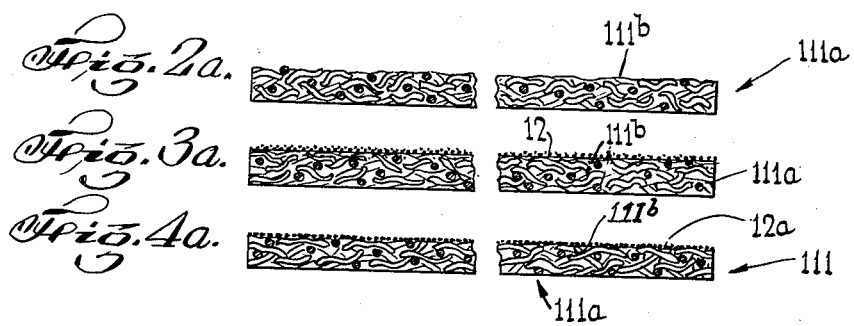
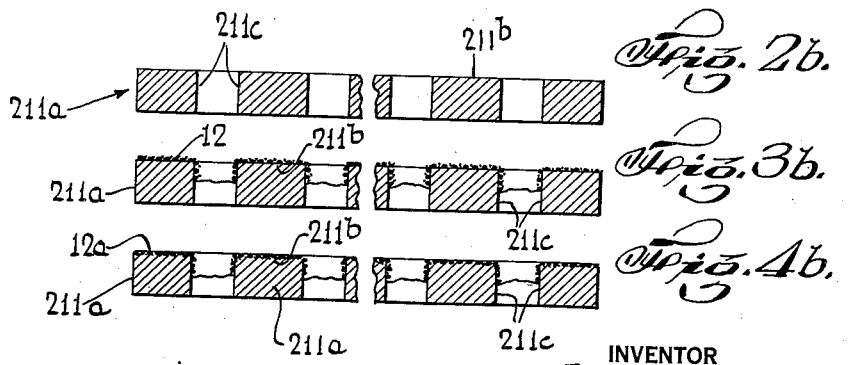
INVENTOR
THEODORE F. MENZEL
BY Louis Barnett
ATTORNEY Dec. 29, 1942.  T. F. MENZEL  2,306,399
PACKAGING
Filed May 17, 1940  2 Sheets-Sheet 2
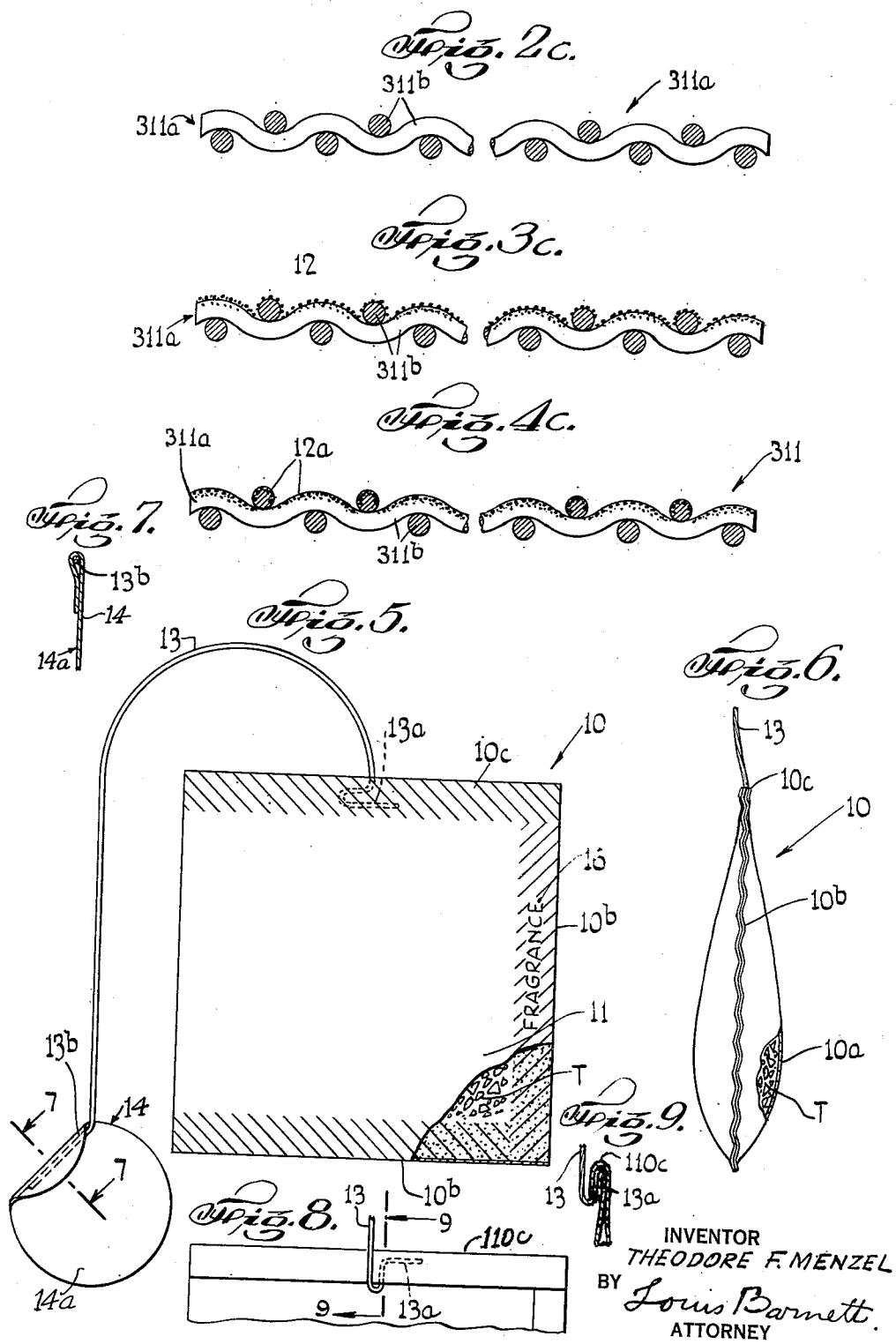
INVENTOR
THEODORE F. MENZEL
BY
Louis Barnett
ATTORNEY Patented Dec. 29, 1942

2,306,399

UNITED STATES PATENT OFFICE 2,306,399

PACKAGING

Theodore F. Menzel, Long Island City, N. Y., assignor to Millie Patent Holding Co., Inc., a corporation of New York Application May 17, 1940, Serial No. 335,694

9 Claims. (Cl. 99—77.1)

This invention relates to the packaging art, and more particularly to the manufacture of filled containers or bags.

Although in practising the invention filled containers or bags may be made for use in packaging various soluble materials, bluing, dyes and the like, the embodiment of the invention as herein described is directed to improvements in the manufacture of packaging of tea, coffee or similar essence containing products made and sold as complete package articles as for example, so-called tea-balls or coffee balls ready for use in brewing beverages. The invention is also directed to the manufacture of novel filter sheet material and to an improved method of producing same, said sheet material being particularly adapted for making the containers or bags for said package-articles, said filter sheet material having inherent properties to permit heat sealing of closures, joints and seams to eliminate the usual mechanical fastening means such as sewing, stitching or stapling commonly used for such purposes.

Among the objects of the invention is to generally improve heat sealing filter sheet material and package articles using such sheet material, and the method of manufacturing said sheet material, the package-article having containers or bag portions thereof made with closure joints and seams formed in part or entirely by heat sealing, the improved sheet material having as an integral part thereof heat sealing properties so as to require no additional adhesive, which shall comprise few elementary parts formed by simple methods and arranged to provide an inexpensive article of new, neat and attractive appearance which shall be particularly adapted for large scale production with high speed automatic bag making, filling and sealing, and which improved method of manufacture of said sheet material, and package-article shall be efficient and practical to a high degree.

Other objects of this invention will in part be obvious and in part hereinafter pointed out.

The invention accordingly consists in the features of constructions and method, combinations of elements, arrangements of parts and steps in the process of manufacture which will be exemplified in the constructions and method hereinafter described and of which the scope of application will be indicated in the following claims.

In the accompanying drawings in which is shown various possible illustrative embodiments of this invention;

Fig. 1 is a diagrammatic plan view illustrating the process for manufacturing heat sealing filter sheet material embodying the invention;

Figs. 2, 3 and 4 show detailed enlarged sectional views of the heat sealing filter sheet material at successive progressive steps during the manufacture thereof using a filtering sheet material formed of a vegetable fibrous pulp as a base layer, taken at lines 2—2, 3—3 and 4—4 in Fig. 1;

Figs. 2a, 3a and 4a show detailed enlarged sectional views of the heat sealing filter sheet material showing successive progressive similar steps to Figs. 2, 3 and 4, using a filter sheet material formed of cotton staple pulp as a base layer;

Figs. 2b, 3b and 4b show detailed enlarged sectional views of the heat sealing filter sheet material showing successive progressive steps similar to Figs. 2, 3 and 4, using a filtering sheet material formed of perforated parchment paper or Cellophane sheet, as a base layer;

Figs. 2c, 3c and 4c show detailed enlarged sectional views of the heat sealing filter sheet material showing successive progressive steps similar to Figs. 2, 3 and 4 using a cotton gauze textile sheet material, as a base layer;

Figs. 5 and 6 are front and side elevational views, respectively, of a complete tea-ball with string handle and tag constructed to embody the invention;

Fig. 7 is a cross-sectional view taken on line 7—7 in Fig. 5;

Fig. 8 is a front elevational view of a fragmentary portion of a tea-ball showing a modified construction of the heat sealed seam joints and anchorage for the string handle; and Fig. 9 is a cross-sectional view taken on line 9—9 in Fig. 8.

In practising the embodiment of the invention for manufacturing tea or coffee balls 10 and particularly heat sealing filter sheet material 11 for constructing the container or bags 10a thereof, a suitable filter paper sheet in the form of base layer 11a, such as made from a vegetable fibrous pulp stock may be used. Said filter paper layer 11a is such that when made into the container or bag 10a of the tea or coffee ball 10 preferably has sufficient strength to retain the shape and form of the tea-ball 10 on immersion in boiling water without damage or disintegration. The filter paper layer 11a of the container 10a portion of the ball 10 serves to permit ready infusion, that is, passage therethrough of the water of immersion for forming a brew and to strain the filling or contents T, such as tea, or coffee from passing out of the ball 10, said layer 11a being of such composition that it is insoluble non-toxic and does not impart in the slightest degree any odor or taste to the brew and has no chemical reaction therewith.

Referring now to Fig. 1, the process of manufacturing the improved heat sealing filter sheet 11 is seen to consist in thinly spreading a finely divided plastic 12 over one side 11b of successive surface portions of filter paper sheet base layer 11a passing under suitable spraying means S, said base layer 11a being preferably in the form of a moving web or strip, a section thereof being shown in Fig. 2. The plastic used may be a synthetic resin of the phenol, urea, formaldehyde, glycerol, phthalic anhydride, acetylene, rubber and petroleum group, and provides the heat sealing means in the manner hereinafter described. The specific group of synthetic resin here selected to produce heat sealing filter sheet 11 illustrating an embodiment of the invention is a thermosetting polymerizing resinous product such as powdered or finely granulated copolymer of vinyl chloride and vinyl acetate, which will leave the heat sealing filter sheet 11 after being processed with no part thereof that will dissolve, give off any odor, alter the taste, or otherwise impart toxic or injurious effects as a food product when incorporated in the finished tea or coffee ball 10 and immersed in boiling water for brewing.

The base layer 11a spread with said plastic 12 over one surface 11b thereof is next heated by any suitable means, such as heater H, to a degree sufficient only to cause the plastic 12 to flow, that is, to soften and cohere, and in which state it is pressed between suitable rollers R or the like to form a film, lamina or superficial coating 12a of finely divided inorganic material adhering to said side 11b of the base layer 11a, as shown in Fig. 4. The degree of heat applied to said plastic 12, however, is insufficient to cause a permanent setting of the plastic forming coating 12a. When said coating 12a is a copolymer of vinyl chloride and vinyl acetate heating temperature of approximately 65° C. will be found satisfactory. Because the base layer 11a used is formed of a vegetable fibre pulp, the rolled coating 12a adheres and is retained by an adsorption thereof around and about the pulp fibres as a pervious structure without substantially decreasing the original porosity or practically effecting the filtering capacity of the paper base layer 11a.

After base layer 11a with the lamina or rolled coating 12a is cooled to room temperature it hardens, which will hereinafter be referred to as "partial fusion" or "partially fused." In this state said coating 12a forms with the base layer 11a heat sealing sheet material 11 which remains flexible and may be coiled up in rolls (not shown) in the well understood manner, ready for use in making containers or bags 10a for ball 10. Heat sealing sheet material 11 when used for the last named purpose is cut into proper size for manufacturing bag 10a which when filled with the contents T, such as tea or coffee, and closed forms the ball 10. The containers or bags 10a are each constructed with the coating 12a side of the sheet material 11 as the interior surface thereof. The edge joints or seams 10b and top closure seam 10c are made by having the coating 12a portion thereof placed in face to face relation, pressed together and heated to a fusion temperature by suitable clamp means of any well known construction to unite the parts forming said edge joint seams 10b or closure seam 10c in permanent adhesion. With coatings 12a formed of copolymer of vinyl chloride and vinyl acetate such permanent sealing fusion will take place when pressed and heated to about 130° C.

Referring now to Figs. 5 to 7, where it is desired to provide a string handle 13 of cotton strands terminated by a tag 14, the strands of the string handle 13a preferably may be processed with a plastic 12 to a "partially fused" state in the manner similar to that described above in the manufacture of heat sealing sheet material 11. An end 13a of the string handle 13 may be inserted between the coated side face to face portions 12a of said sheet material 11 during the formation of the top closure joint or seams 10c, and the final sealing heat applied simultaneously to anchored end 13a within the joint seams 10c and the entire joint seam 10c for permanently fusing thereof.

To secure the tag 14 to the terminating or free end 13b of the string handle 13 opposite the anchored end 13a, one side 14a of each tag 14 may also be processed in the manner described above in the manufacture of heat sealing sheet material 11, and if desired may be folded over said processed string handle end 13b therebetween. The "partially fused" plastic material side 14a of said tag 14 in face to face relation and the string handle end 13b are then united on pressure and application of heat to a degree for permanent fusion.

While the above described method of attaching the tag 14 to the string handle end 13b is preferred, it is to be understood that such attachment may also be accomplished by simply pressing and permanently fusing the string handle end 13b to the coated 14a side of the tag 14 without folding of the latter.

In Figs. 2a, 3a and 4a there is illustrated the results of successive steps of the improved manufacturing process applied to a filter paper base layer 111a formed of cotton staple pulp stock having an upper surface 111b on which the said plastic 12 is thinly spread, and which when heated, roller and cooled for "partial fusion" provides a lamina or superficial coating 12a as part of heat sealing filter sheet material 111 in the same manner as described above for the heat sealing filter sheet material 11. The coating 12a formed on the side 111a coheres and is retained by an absorption thereof on the portion of the side 111b of cotton staple pulp of base layer 111a as a pervious structure without substantially decreasing the original porosity of said filter paper base layer 111a.

Although filter paper base layer 111a formed of cotton staple pulp stock has a much lower tensile strength when wet and immersed in hot water than filter paper base layer 11a of the same thickness formed of vegetable fibre pulp stock, the addition of the superficial coating 12a on either of said layers 11a or 111a increases the wet tensile strength of each, and in the case of base layer 111a makes the same of sufficient strength to be practical for making all types of tea balls 10 which otherwise would not be possible. A thinner grade of filter sheet layer 11a or 111a can also be used than would otherwise be required in making bag 10a if the superficial coating 12a was not provided.

Since the structures of the filter sheet base layers 11a and 111a are made of paper pulp stock, when each is provided with a porous lamina 12a the thermosetting heat sealing filter sheet materials 11 and 111, respectively, formed, are inherently sift-proof when used for making infusion bags containing even the finest of powdered products, such as tea T having dry dust particles as part of the contents thereof.

In Figs. 2b, 2c and 2d there is shown successive steps of the improved manufacturing process applied to a filter base layer 211a formed of a parchmentized paper, cellophane or the like base layer, perforated at 211c and having an upper surface 211b on which a superficial coating or lamina 12a is formed from spread "partially fused" plastic 12 embodying the invention to provide heat sealing filter sheet material 211, the parchmentized paper base layer 211a being of the type used for cooking purposes. If clogging up the perforation 211c is experienced when providing the coating 12a, an additional step (not shown) of blowing air upwardly through the layer 211a to clear the perforation 211c before "partial fusion" said coating 12a is completed.

Instead of using as base layers 11a, 111a and 211a described above, a filter cotton gauze or woven textile base layer 311a may be substituted surfaces of the cotton strands of the side 311b having an upper surface 311b on which the finely divided plastic 12 is thinly spread and which when processed to provide the superficial coating or lamina 12a forms a heat sealing filter sheet 311 which may be used like heat sealing filter sheet material 11, 111 and 211 described above. Here again the superficial coating 12a is retained by an absorption thereof on portions of the upper surfaces of the cotton starands of the side 311b forming the gauze layer 311a as a pervious structure without substantially decreasing the original porosity of said filter cotton gauze base layer 311a.

The superficial coating 12a also serves to increase the tensile strength of heat sealing filter sheet material 211 and 311 so that the base layer materials 211a and 311a, respectively, may be thinner than is practically required when such coating 12a is not used.

Each of the heat sealing filter sheet materials 111, 211 and 311 remain flexible and may be coiled up like sheet material 11 described above, and any one of said sheet materials 11, 111, 211 or 311 may be utilized for forming the bags 10a by providing permanently fused joint seams in the entire construction or in part thereof and for making complete tea ball 10 with string handles 13 and tags 14 in the same manner as described above.

If desired the fused edge portions may be impressed or embossed by suitable die (not shown) with word, legend or symbol 16 on application of molding pressure during the permanent fusing of the seam joint 10b, see Fig. 5.

In Figs. 8 and 9 there is shown another construction of tea ball seam joints and anchorage for the string handle. Here the closure seam joint 110c and edge seam joint 110b are made with a fold which preferably is formed prior to the permanent fusing thereof. The resulting seam will be found to be a united stiffened structure. The string handle end 13a is also located within the fold as shown, prior to the permanent fusion operation. In providing this folded type of stiffened seam joint structure along the edge portions of the tea balls, the same serves as a shape retaining means.

It should be noted that by coating the cotton strands of the entire string handle 13 with a "partially fused" thermosetting plastic 12 and finally fusing same, as for example, simultaneously with the formation of joint seam 10c or the attachment of the tag 14 with the string handle 13, the tensile strength of the string handle 13 is materially increased, thereby permitting the use of thinner cotton strands forming said string handle for saving such strand material.

It will thus be seen that there is provided a package, package making material and a method for producing the latter in which the several objects of the invention are achieved and which are well adapted to meet the conditions of practical use.

As various other possible embodiments of the invention might be made of the above invention, and as various changes might be made in the embodiments above set forth, it is to be understood that all matters herein set forth or shown in the accompanying drawings and described in the specification is to be interpreted as illustrative and not in a limiting sense.

Having thus described my invention, I claim as new and desire to secure by Letters Patent:

1. A package containing an infusion product, a pervious bag free from perforations enclosing said product and formed of a single heat sealing sift proof filter sheet, the latter comprising a filter sheet layer base coated on one side thereof with a dry porous lamina of "partially fused" thermosetting plastic to form the interior surface of said bag, said bag having a joint seam united by a face to face permanent fusion of said lamina along said joint seam to form an edge closure for the bag, said filter layer and lamina coating of the remaining interior surfaces constructed and arranged to have a filtering capacity substantially that of said layer alone.

2. The package defined in claim 1 in which said edge closure is of substantially uniform cross-sectional shape throughout the length thereof, and outer surface of the edge closure having impressed therein an indicia.

3. The package defined in claim 1 having a string handle terminated by a tag at a free end thereof, the other end of said string handle being coated with a "partially fused" thermosetting plastic, said last mentioned end being anchored in said joint seam by the permanent fusion in the edge closure.

4. The package defined in claim 1 having a string handle terminated by a tag at a free end thereof, the other end of said string handle being coated with a "partially fused" thermosetting plastic, said end being anchored in the joint seam by the permanent fusion in the edge closure, the free end of said string handle and a surface portion of the tag also being coated with a "partially fused" thermosetting plastic for securing the tag to said free string handle end by a permanent fusion of the plastic coatings of said free string handle end to said tag surface portion.

5. A package containing an infusion product, a pervious bag enclosing said product and formed of a heat sealing sift-proof filter sheet, the latter comprising a filter sheet layer base coated on one side thereof with a dry porous lamina of "partially fused" thermosetting plastic to form the interior surface of said bag, said bag having a folded edge portion forming a joint seam, the latter being permanently united in folded condition by a final fusion of said lamina thereof.

6. A package containing an infusion product, a pervious bag enclosing said product and formed of a heat sealing filter sheet, the latter comprising a filter sheet layer base coated on one side thereof with a dry porous lamina of "partially fused" thermosetting plastic to form the interior surface of said bag, said bag having a folded edge portion forming a closure joint seam, the latter being permanently united in folded condition by a final fusion of said lamina thereof, and a string handle terminated by a tag at the free end thereof, the other end of said string handle being coated with a "partially fused" thermosetting plastic and anchored in the folded closure joint seam by said final fusion.

7. A package of the character described having an infusion product, a container enclosing said product formed of imperforated strainer sheet material adapted to permit water to permeate therethrough, said strainer sheet material comprising a foraminous layer coated with a dry filter film of a "partially fused" thermosetting plastic on one side of the layer so constructed and arranged that said layer and the filter film have substantially the same filtering capacity as said foraminous layer without the filter film, the latter having heat sealing properties for making joint seam portions of the container when such portions are placed in face to face relation and heated to a degree for causing a final fusion of said "partially fused" plastic and permanent adhesion of said portions.

8. In a package of the character described containing a product for making an infusion, a bag formed of sift-proof filter sheet material adapted to strain any finely powdered portion of said product from an infusion thereof permeating through the bag, said sheet material comprising an imperforated porous base layer coated with a dry film of a "partially fused" plastic having thermosetting properties and spread on one side of said layer as an imperforated porous lamina, said filter sheet having substantially the same filtering capacity as the base layer without the film coating, said bag having joint seams formed by "partially fused" portion thereof placed in face to face relation and thermosettingly fused to a permanent adhesion of said portion.

9. In the package as defined in claim 8 the joint seams being formed with folded edge portions which are permanently united in folded condition by said permanent adhesion thereof.

THEODORE F. MENZEL.